3,169,113
EMULSIFIER COMPOSITIONS AND USES THEREOF

Willard H. Kirkpatrick, Sugar Land, and Virgil L. Seale and Richard E. Berkley, Houston, Tex., assignors to Nalco Chemical Company, a corporation of Delaware
No Drawing. Filed July 17, 1961, Ser. No. 124,387
18 Claims. (Cl. 252—8.55)

This invention, in general, relates to emulsifier compositions comprising mixtures of two or more compounds and to uses thereof, especially in the formation of water-in-oil emulsions in which the dispersed, internal aqueous phase is strongly acidic. The emulsifiers of the invention and the emulsions prepared therewith are especially suitable for use in the formation of acidic water-in-oil hydraulic fracturing fluids for fracturing and acidizing subterranean formations to increase their productivity of oil and/or gas.

The requirements of an emulsifier for a water-in-oil fracturing fluid are somewhat unique, especially where the water phase contains an acid such as hydrochloric acid. The emulsion should be stable at temperatures ranging from about 60° F. to about 175° F. Furthermore, it should be capable of carrying substantial quantities of sand grains or other propping agents used to prop the formation apart after it has been fractured and the pressure released. Still further, the emulsion should be stable in the presence of corrosion inhibitors added to the emulsion to prevent attack on metal components of the well and the pumping equipment by the acid in the aqueous phase of the emulsion. After meeting all of these requirements, the emulsifier preferably should be one which will not form a stable emulsion when the acid is neutralized by its contact with limestone or other basic minerals of the formation. The ideal emulsifier is one which will produce an initially stable emulsion which breaks upon neutralization of the unspent acid and also one which will not re-emulsify the oil and aqueous phases after the emulsion has broken.

It is an object of this invention to provide improvements in emulsifiers for water-in-oil emulsion systems.

Another object is to provide improvements in emulsifiers for water-in-oil hydraulic fracturing fluids.

A further object of the invention is to provide improvements in emulsifiers for water-in-oil emulsions in which the aqueous phase is strongly acidic.

Still another object of the invention is to provide improvements in water-in-oil emulsions of the aforesaid type.

Another object of the invention is to provide improvements in processes for hydraulically fracturing subterranean formations with a water-in-oil emulsion fracturing fluid in which the aqueous phase is strongly acidic. These and other objects of the invention, which will be apparent to those skilled in the art from the following description of the invention, may be achieved by the practice of the invention hereinafter described.

The improvements of our invention are achieved by using an emulsifier having at least two components. The emulsifying agents of our invention will contain one or both of (a) a 9–18 carbon monocarboxylic acid fatty acid salt of a partial amide of a polyalkylene polyamine with 2–6 carbon alkylene groups and 3–5 amino nitrogens in which at least two amino groups are amidified with 9–18 carbon monocarboxylic fatty acids and wherein there is at least one nonamidified amino group forming a salt with the acid and (b) a polyamide of an alkylene polyamine with 2–6 carbon alkylene groups and 2–5 amino nitrogens and a 9–18 carbon monocarboxylic fatty acid. The term "polyamide" is intended to mean a monomeric amide of an alkylene polyamine of the aforementioned type in which at least two of the amino nitrogens are amidified with a 9–18 carbon monocarboxylic fatty acid.

In accordance with one aspect of our invention the aforesaid polyamide and the aforesaid salt constitute the two components of the emulsifying agent. They are mixed in ratios of 5–50% of said salt and 50–85% of said polyamide, said percentages being based on the total weight of the salt and polyamide.

The monocarboxylic fatty acids which can be used for purposes of the invention include saturated and unsaturated fatty acids ranging from 9–18 carbons. The examples thereof are pelargonic acid, undecylenic acid, lauric acid, myristic acid, palmitic acid, stearic acid, myristoleic acid, palmitoleic acid, oleic acid, linoleic acid, elaoestearic acid, ricinoleic acid, and the like, as well as mixtures obtained by the hydrolysis of fatty materials such as tall oil fatty acids containing at most 5% of rosin acids, soy bean oil fatty acids, lard oil fatty acids, linseed oil fatty acids, etc.

The alkylene polyamines used in the practice of the invention include, among others, ethylene diamine, diethylene triamine, triethylene tetramine, tetraethylene pentamine, propylene diamine, dipropylene-1,2-triamine, tripropylene-1,2-tetramine, tetrapropylene - 1,2 - pentamine, hexamethylene diamine, bis-hexamethylene triamine, tris-hexamethylene tetramine and the like, as well as mixtures thereof.

Besides the aforesaid emulsifiers which are a mixture of (a) 15–50% by weight of a 9–18 carbon monocarboxylic fatty acid salt of a partial amide of a polyalkylene polyamine with 2–6 carbon alkylene groups and 3–5 amino nitrogens in which at least two amino groups are amidified with 9–18 carbon monocarboxylic fatty acids and wherein there is at least one nonamidified amino group forming a salt with said acid and (b) 50–85% by weight of a polyamide of an alkylene polyamine with 2–6 carbon alkylene groups and 2–5 amino nitrogens and a 9–18 carbon monocarboxylic fatty acid, said percentages for (a) and (b) being based on the total weight of (a) and (b), other emulsifier compositions of the invention are hereinafter described.

A fatty acid salt of a partial amide and/or a polyamide and a monocarboxylic fatty acid polyester of a tri-lower alkylolamine are mixed to provide a mixture of (a) 15–60% by weight of a member selected from the group consisting of a 9–18 carbon fatty acid salt of a partial amide of a polyalkylene polyamine with 2–6 carbon alkylene groups and 3–5 amino nitrogens in which at least two amino groups are amidified with 9–18 carbon monocarboxylic fatty acids and wherein there is at least one nonamidified amino group forming a salt with said acid, a polyamide of an alkylene polyamine and a 9–18 carbon monocarboxylic fatty acid, and mixtures of said salt and said polyamide, and (b) 40–85% by weight of a 9–18 carbon monocarboxylic fatty acid polyester of a tri-lower alkylolamine, said percentages for (a) and (b) being based on the total weight of (a) and (b).

The term "polyester" means a monomeric compound which is an ester of the described type in which at least two of the hydroxyl groups of the tri-lower alkylolamine are esterified with a 9–18 carbon monocarboxylic fatty acid. The lower alkylol groups of the amine may be 2–4 carbon alkylol groups. Examples of these amines are triethanol amine, tripropanolamine and tributanolamine.

In another embodiment of the invention, instead of using the alkylolamine polyester, there may be used a quaternary salt of a N,N-di-hydroxyalkyl aliphatic monoamine of 12–18 carbons. The quaternizing agent may be any of the usual amine quaternizing agents such as benzyl chloride, methyl chloride, ethyl chloride, ethylene dichloride, propyl chloride or the corresponding bromides or di-lower alkyl sulfates, such as dimethyl sulfate or diethyl sulfate. The aliphatic monoamines include such amines as lauryl amine up to stearyl amine or amine mixtures derived from corresponding mixtures of fatty acids such as coco amine derived from coconut oil fatty acids and soy amine derived from soy bean oil fatty acids. The hydroxyalkyl groups on the amino nitrogens are lower hydroxyalkyl groups such as 2-hydroxyethyl, 2(or 3)-hydroxylpropyl, 2(or 3 or 4)-hydroxybutyl.

The quarternary salt is combined to provide a mixture with the fatty acid salt and/or the polyamide of (a) 60–90% by weight of a member selected from the group consisting of a 9–18 carbon fatty acid salt of a partial amide of a polyalkylene polyamine with 2–6 carbon alkylene groups and 3–5 amino nitrogens in which at least two amino groups are amidified with 9–18 carbon monocarboxylic fatty acids and wherein there is at least one nonamidified, amino group forming a salt with said acid, a polyamide of an alkylene polyamine and 9–18 carbon monocarboxylic fatty acid, and mixtures of said salt and said polyamide, and (b) 10–40% by weight of a quaternary salt of an N,N-dihydroxyalkylated aliphatic monoamine of 12–18 carbons wherein the quaternizing agent is selected from the group consisting of benzyl chloride, lower alkyl chlorides and bromides, and di-lower alkyl sulfates, said percentages for (a) and (b) being based on the total weight of (a) and (b).

In a further embodiment of the invention, the fatty acid salt and/or polyamide is mixed with a polyoxyethylated monoalkyl phenol, a polyoxyethylated dialkyl phenol and/or a polyoxyethylated 12–18 carbon aliphatic monoamine, the aliphatic monoamine being of the type heretofore described. The alkyl group of the phenols is one having 4–12 carbons, or a mixture of alkyl phenols having an average of 4–12 carbons per alkyl group may be used. Examples of said phenols are o- or p-butylphenol, o- or p-nonylphenol, o- or p-dodecylphenol, o,p-dibutylphenol, o,p-dinonylphenol and the like. These compounds are oxyethylated to provide an average of about 4–15 oxyethylene groups per molecule.

The emulsifiers in accordance with this aspect of the invention are formulated to provide a mixture of (a) 15–60% by weight of a member selected from the group consisting of a 9–18 carbon fatty acid salt of a partial amide of a polyalkylene polyamine with 2–6 carbon alkylene groups and 3–5 amino nitrogens in which at least two amino groups are amidified with 9–18 carbon monocarboxylic fatty acids and wherein there is at least one nonamidified, amino group forming a salt with said acid, a polyamide of an alkylene polyamine and a 9–18 carbon monocarboxylic fatty acid, and mixtures of said salt and said polyamide, and (b) 25–75% by weight of a polyoxyethylated organic compound selected from the group consisting of monoalkyl phenols, di-alkyl phenols, 12–18 carbon aliphatic monoamines, and mixtures thereof, said polyoxyethylated compounds having an average of about 4–15 oxyethylene groups per molecule, said percentages for (a) and (b) being based on the total weight of (a) and (b).

A still further aspect of the invention involves emulsifiers of (a) 45–80% by weight of the aforesaid fatty acid salt and/or polyamide and (b) 20–55% by weight of a tri-lower alkyl amine wherein the alkyl groups have 3–6 carbons, e.g., tripropyl amine, tributyl amine, dipropyl butyl amine, trihexylamine and the like, said percentages for (a) and (b) being based on the total weight of (a) and (b).

The emulsifier mixtures of the invention may be binary mixtures, trinary mixtures or tertiary mixtures of the aforesaid compounds with the stipulation that one of said compounds must be the aforesaid fatty acid salt or the aforesaid fatty acid polyamide. Therefore, the invention embraces in its generic aspects mixtures of (I) (a) 15–80% by weight of a member selected from the group consisting of a 9–18 carbon fatty acid salt of a partial amide of a polyalkylene polyamine with 2–6 carbon alkylene groups and 3–5 amino nitrogens in which at least two amino groups are amidified with 9–18 carbon monocarboxylic fatty acids and wherein there is at least one nonamidified, amino group forming a salt with said acid, a polyamide of an alkylene polyamine with 2–6 carbon alkylene groups and 2–5 amino groups and a 9–18 carbon monocarboxylic fatty acid, and mixtures of said salt and said polyamide, and (b) at least one of the members selected from the group consisting of 40–85% by weight of a 9–18 carbon monocarboxylic fatty acid polyester of a tri-lower alkylol amine, 10–40% by weight of a quaternary salt of an N,N-dihydroxyalkylated aliphatic monoamine of 12–18 carbons wherein the quaternizing agent is selected from the group consisting of benzyl chloride, lower alkyl chlorides and bromides, and di-lower alkyl sulfates, 25–75% by weight of a polyoxyethylated organic compound selected from the group consisting of monoalkyl phenols, di-alkyl phenols, 12–18 carbon aliphatic monoamines, and mixtures thereof, said polyoxyethylated compounds having an average of about 4–15 oxyethylene groups per molecule, 20–55% by weight of a tri-lower alkyl amine wherein the alkyl groups have 3–6 carbons, said percentages in said mixture being based on the total weight of said compounds of said mixture, and (II) (a') 15–50% by weight of a 9–18 carbon monocarboxylic fatty acid salt of a partial amide polyamine with 2–6 carbon alkylene groups and 3–5 amino nitrogens of a polyalkylene in which at least two amino groups are amidified with 9–18 carbon monocarboxylic fatty acids and wherein there is at least one non-amidified amino group forming a salt with said acid and (b') 50–85% by weight of a polyamide of a polyalkylene polyamine with 2–6 carbon alkylene groups and 2–5 amino nitrogens and a 9–18 carbon monocarboxylic fatty acid, said percentages for (a') and (b') being based on the total weight of (a') and (b').

The emulsifiers of the invention can be used in the formulation of water-in-oil emulsions of many types. They are peculiarly effective, however, in the formation of emulsions in which the aqueous phase contains about 5–25% by weight of an inorganic acid, especially hydrochloric acid. The latter acid is the one most effectively and commonly used in the acidizing of oil-bearing formations to increase the permeability thereof. These emulsifiers form stable emulsions in the presence of an acidic internal aqueous phase and are not inhibited in their emulsifying properties by the presence of most of the commonly used corrosion inhibiting agents added to the emulsions to prevent attack of the acid on metal parts of the well or the pumping system. They also have the property of losing their emulsifying character when the acidic, aqueous phase is neutralized. Upon neutralization of the acidic, aqueous phase, about 75% or more of the emulsion breaks. Furthermore, the water phase and the oil phase of the broken emulsion does not re-emulsify as the broken emulsion is returned to the surface of the well.

The following examples illustrate the embodiments of the invention, but the invention is not limited thereto. The parts or percentages are by weight unless otherwise indicated. The solvent of each example is a heavy aromatic petroleum hydrocarbon fraction containing benzene, toluene, xylene and higher aromatics. Its behavior as a solvent in many respects resembles xylene.

*Example 1*

Refined tall oil consisting essentially of tall oil fatty acids was reacted to form the diamide of diethylene triamine. This was accomplished by mixing 300 parts of refined tall oil, 200 parts of aromatic solvent and 50 parts of diethylenetriamine. During a period of slightly less than two hours, the mixture was heated up to 235° C. and the aqueous distillate formed during the reaction was removed. The resulting product was essentially the diamide of diethylenetriamine dissolved in aromatic solvent.

One hundred parts of this solution of the diamide was blended with 25 parts of refined tall oil to form a tall oil fatty acid salt of the amide, the salt formation being at the unreacted amine group of the diethylene triamine.

The emulsifier was formulated by blending together equal parts by weight of the solution of the refined tall oil salt of the refined tall oil diamide of diethylenetriamine and polyoxyethylated p-nonylphenol containing an average of about 4 oxyethylene groups per mol of nonylphenol.

Example II

Equal volumes of (a) the salt of the refined tall oil diamide of diethylene triamine solution of Example I, (b) polyoxyethylated p-nonylphenol having an average of about four oxyethylene groups per mol of xylylphenol and (c) a polyoxyethylated 60:40 mixture of p-nonylphenol and o,p-dinonylphenol having an average of about 4.6 polyoxyethylene groups per mol of phenol were blended to provide an emulsifier which forms an emulsion of 10% of a 15% hydrochloric acid aqueous solution and 90% kerosene, which forms easily at a concentration of 0.5% by volume of the emulsifier with respect to the total emulsion volume and which will carry one pound per gallon of emulsion of 20-40 mesh sand at a temperature of 175° F. for a period of not less than 3 hours.

Example III

Thirty-eight parts of the blend of Example II is blended with two parts of polyoxyethylated rosin amine having about 11 mols of oxyethylene groups per mol of rosin amine.

Example IV

Thirty-six parts of the blend of Example II is blended with two parts of polyoxyethylated rosin amine having about 11 mols of oxyethylene groups per mol of rosin amine.

Example V

An emulsifier is formulated by mixing 855 parts of the mixture of Example I with 45 parts of polyoxyethylated rosin amine having an average of about 11 mols of the oxyethylene group per mol of rosin amine.

Example VI

An emulsifier is formulated by mixing 810 parts of the mixture of Example I with 90 parts of polyoxyethylated rosin amine having an average of about 11 mols of the oxyethylene group per mol of rosin amine.

Example VII

Sixteen volumes of the solution of the refined tall oil salt of the refined tall oil diamide of diethylene triamine and 4 volumes of a solution in aromatic solvent of a quaternary salt of N,N-di-2-hydroxyethyl coco amine were blended to provide an emulsifier composition. The quaternary salt is prepared by hydroxyethylation with ethylene oxide of coco amine, an amine derived from a mixture of coconut oil fatty acids, which is thereafter heated in a ratio of 272 parts of the N,N-di-2-hydroxyethyl coco amine and 126 parts of benzyl chloride for 4 hours with agitation at 135° C. The resulting quaternary salt is then blended with 1604 parts of aromatic solvent.

Example VIII

An emulsifier blend is produced by mixing 16 volumes of the refined tall oil salt of the refined tall oil diamide of diethylene triamine solution of Example I with 4 volumes of a solution in aromatic solvent of N,N-di-2-hydroxyethyl benzyl soy ammonium chloride. The latter solution is prepared by hydroxyethylating a mixture of aliphatic monoamines derived from soy bean oil fatty acids and heating this product in a ratio of 328 parts to 126 parts of benzyl chloride for 4 hours with agitation at 135° C. The resulting quaternary salt was then blended with 1024 parts of aromatic solvent.

Example IX

An emulsifier composition is produced by blending 529 parts of the refined tall oil diamide of diethylene triamine solution obtained in accordance with the procedure of Example I with 72 parts of pelargonic acid.

Example X

Four volumes of a solution of a refined tall oil salt of the refined tall oil diamide of diethylene triamine obtained in accordance with the procedure of Example I are blended with 16 parts by volume of the refined tall oil triester of triethanolamine in aromatic solvent. The latter material was derived by mixing 1258 parts of refined tall oil, 166 parts of triethanolamine still bottoms, comprising triethanolamine and a minor percentage of polyoxyethylated ammonia compounds, and 100 grams of aromatic solvent and heating the mixture up to a temperature of 287° C. with the removal of aqueous distillate. Upon cooling, the reaction product was blended with 700 parts of aromatic solvent to provide the triester solution.

Example XI

Four parts by volume of the diamide salt of Example I are blended with 16 parts by volume of a refined tall oil triamide of bis-hexamethylene triamine in aromatic solvent. The triamide was produced by heating a mixture of 1091 parts of refined tall oil, 261 parts of bis-hexamethylene triamine and 48 parts of the solvent up to a temperature of 284° C. Upon cooling, the mixture was further blended with 813 parts of aromatic solvent.

Example XII

A refined tall oil triamide of diethylene triamine solution was prepared by heating 1125 parts of refined tall oil, 128 parts of diethylene triamine and 750 parts of aromatic solvent up to a temperature of 238° C. The aqueous distillate was removed. Upon cooling, the product was further blended with 46 parts of aromatic solvent to replace that distilled off in the reaction.

Six volumes of this triamide solution were blended with 16 volumes of a solution in aromatic solvent of a diester of triethanolamine and refined tall oil.

The latter solution of the diester was prepared by heating, with the removal of aqueous distillate, up to 278° C. of a mixture of 1,255 parts of refined tall oil and 248 parts of triethanolamine still bottoms. Upon cooling, the diester was blended with 697 parts of aromatic solvent.

Example XIII

Six volumes of the solution of the refined tall oil triamide of diethylene triamine described in Example XII are blended with 14 volumes of the solution of the refined tall oil triester of triethanolamine. The latter solution is described in Example X.

Example XIV

Ten volumes of the solution of the refined tall oil triamide of diethylene triamine described in Example XII were blended with 10 volumes of the solution of the refined tall oil triamide of bis-hexamethylene triamine described in Example XI.

Example XV

A solution of a triamide of refined tall oil and dipropylene triamine still bottoms (consisting primarily of tripropylene tetramine) was prepared by heating up to a temperature of 190° C. with the removal of aqueous distillate of a mixture of 782 parts of aromatic solvent, 245 parts of dipropylene triamine still bottoms and 1,173 parts of refined tall oil. Upon cooling, 56 parts of the solvent were added to replace the solvent distilled off in the reaction. Ten parts by volume of this solution were then blended with 10 parts by volume of a solution of the refined tall oil diamide of bis-hexamethylene triamine in aromatic solvent.

The latter solution was produced by heating up to a temperature of 222° C. with the removal of aqueous distillate of a mixture of 1,004 parts of refined tall oil, 360 parts of bis-hexamethylene triamine and 86 parts of aromatic solvent. Upon cooling, the reaction product was blended with 760 parts of aromatic solvent.

*Example XVI*

An emulsifier and emulsifier composition was prepared by blending 15 volumes of the solution of the refined tall oil triamide of diethylenetriamine described in Example XII, 25 volumes of the solution of the refined tall oil triester of triethanolamine described in Example X and 10 volumes of the solution of the refined tall oil diamide of diethylene triamine described in Example I.

*Example XVII*

An emulsifier composition is produced by blending 25 volumes of the composition of Example XI with 15 volumes of tributylamine.

With reference to the foregoing examples, the emulsifier compositions of Examples III through VI are ones whose emulsions break readily when the hydrochloric acid in the internal phase of the emulsion is neutralized. The emulsifier compositions of Examples VII through XI were found to avoid any difficulty occurring with some other types of commercial emulsifiers for acid fracturing fluids, i.e., the re-emulsification of the aqueous phase after it had been neutralized in the hole. These emulsifier compositions of the invention were found to be satisfactory from the standpoint of having minor re-emulsification characteristics upon neutralization of the aqueous phase where an acid corrosion inhibitor based on alkyl pyridine and propargyl alcohol was employed in the acid fracturing emulsion.

The emulsifiers of Examples X through XV have good performance as emulsifiers for acid fracturing fluids in the presence of many types of acid corrosion inhibitors, including inhibitors based upon higher acetylenic alcohols and acetylenic halides, blended with a water-soluble non-ionic surfactant.

The emulsifier composition of Example XVI was designed to give greater emulsion stability in acid fracturing fluids using concentrations of corrosion inhibitors up to six gallons per thousand gallons of emulsion. The emulsion stability was satisfactory and the composition was about 70% effective in preventing re-emulsification of the spent acid.

The tributyl amine in Example XVII is an effective additive for making the emulsion break quickly upon neutralization of the aqueous phase. It is especially effective in emulsion systems in which the acid corrosion inhibitor is one based upon alkyl pyridines and higher acetylenic alcohols, e.g., propargyl alcohol and most other acid corrosion inhibitors. One type of alkyl pyridines is a crude mixture of alkylated pyridine obtained as a by-product in the manufacture of 2-methyl, 5 ethyl pyridine. Other inhibitors which may be used in the emulsion systems of the invention are polyoxyethylated rosin amine, complex fatty acid amides, inorganics such as arsenous oxide and the like. The tributylamine also decreased markedly the tendency of the spent acid to re-emulsify in the oil phase.

The emulsions of the invention are oil external. The ratio of the acidic aqueous phase to the oil phase ranges from about 70% to 95% oil and 5–25% aqueous phase. Where the aqueous phase is acidic, as in an acid fracturing emulsion, the concentration of the acid, e.g., hydrochloric acid, ranges from about 5–25% by weight of the aqueous phase. The acid corrosion inhibitors range in the order of about 0.2% to about 0.6%. The weight ratio of the active emulsifying agents in the emulsifying composition solutions are in the order of about 0.02–0.3% by weight with respect to the total weight of the emulsion.

The emulsion is formed by adding the aqueous phase to the oil with agitation after addition of the emulsifier.

Fracturing emulsions normally contain a propping agent suspended therein. The most commonly used propping agent is a relatively fine grained sand in the order of 10–80 mesh grain size. The emulsion must suspend the propping materials, e.g., sand at concentrations in the emulsion of about 10–30% by weight of the emulsion, for a period of three hours up to about 24 hours at temperatures as low as about 75° F. and as high as about 175° F. in order to be ideal emulsifiers.

While a heavy aromatic solvent was used as the solvent for the reactants and/or as a diluent for the reaction products in the foregoing examples, other solvents, preferably aromatic solvents, may be employed, among which may be listed benzene, toluene, xylene, ethyl benzene, etc.

The oil phase of the emulsions of the invention may be any economical petroleum oil or liquid fraction thereof such as crude oil, kerosene, light distillate fuel oil, $SO_2$ extract, etc.

The following laboratory tests with emulsifiers of the invention are indicative that they have surface-active properties which make them useful as emulsifiers for acidic water-in-oil emulsions where an emulsion is desired which is stable at formation temperatures during the time required to penetrate and rupture the formation, will break completely upon neutralization of the acid when it acidizes the formation, and will not form a stable emulsion when the aqueous phase has a pH greater than about four.

The compositions tested were prepared as follows.

*Composition A*

Refined tall oil was reacted with diethylene triamine to produce the tall oil triamide of diethylene triamine. This was accomplished by heating, in parts by weight, 1125 parts of refined tall oil, 128 parts of diethylene triamine, and 100 parts of the previously described aromatic hydrocarbon solvent to 244° C. to remove 68 parts of aqueous distillate. Upon cooling of the reaction mixture to 150° C., 661 parts of aromatic hydrocarbon solvent was added to give a 60% active solution of the triamide.

This solution was blended in a ratio of 9 volumes of the triamide solution to one volume of tributyl amine to produce Composition A.

*Composition B*

This composition is the same as Composition A except that the triamide solution and tributyl amine are blended at a volume ratio of 17:3, respectively.

*Composition C*

A quaternary salt is prepared by heating 272 parts of N,N-dihydroxyethyl coco amine and 126 parts of benzyl chloride at 80–120° C. for two hours, after which 1604 parts of the previously described aromatic hydrocarbon solvent is added to the reaction product to provide a 20% active solution of N,N-dihydroxyethyl coco benzyl ammonium chloride, N,N-dihydroxyethyl coco amine hydrochloride and benzyl alcohol in which about 90–95% of the amines are quaternary and about 5–10% are tertiary.

The composition is prepared by blending one volume of the above 20% solution with nine volumes of the triamide solution described under Composition A.

*Composition D*

Sixteen volumes of the triamide solution described under Composition A, two volumes of the amine solution described under Composition C and two volumes of tributyl amine are blended together.

The following test methods were used in evaluating the emulsifier compositions.

*Ease of emulsification*

A paddle type stirrer capable of 5000 r.p.m. is used. It should provide a small center of agitation relative to the total emulsion volume (that is, less than half the emulsion should be in turbulent flow at half speed). The chemical is added to kerosene or other oil and agitated with the stirrer at approximately half speed. The acid is added within approximately 20 to 30 seconds, faster, if possible. The stirrer is then turned up to full speed for about 30 seconds, the emulsion is observed to: not form or break when stirring stops or shortly thereafter (X); or form normally (V).

*Sand bearing*

Seven cc. of 40/60 mesh sand per 100 cc. are dispersed in the emulsion. The sanded emulsion is observed at 75° F. and 175° F. to determine the duration of stability. The emulsion is considered broken when substantially all the sand and about one tenth of the acid has separated. Sand bearing stability is recorded as acceptable (V) or unacceptable (X).

*Neutralization*

Chopped oyster shell or similar calcareous material in great excess of the amount equivalent to the acid is added to the emulsion during agitation. The agitation should be at least as great as was used to form the emulsion. Stirring is continued until a pH of four is reached. The emulsion, meantime, will either have broken (V), or not (X).

*Reemulsification*

The phases of the broken emulsion are separated. The oil phase is agitated with the stirrer at half speed, and the aqueous phase is added dropwise. Addition need not require more than three minutes. The emulsion will be observed to: fail to survive the cessation of stirring (G); break within a few minutes (B (No. minutes)); or remain stable beyond a half hour (R).

*Stability to shearing*

A sample of the emulsion is put through a homogenizer and observed for subsequent instability. Acid separation in excess of about 5% is unacceptable. Stability is recorded as acceptable (V) or unacceptable (X).

The results with the best emulsifier compositions tested are reported in the following table. Each test emulsion contained 0.2% by weight of a commercial corrosion inhibitor, the primary active components of which are alkyl pyridines and acetylenic alcohols.

TABLE

| Oil Phase | Emulsifier Comp | Vol. Conc., Percent | Emulsi̇̂catio | Stability | | Neutralization | Reemulsification | Shear |
|---|---|---|---|---|---|---|---|---|
| | | | | 75° F. | 175° F. | | | |
| Crude oil | A | 0.3 | V | V | --- | V | G | V |
| Kerosene | B | 0.2 | V | V | --- | V | B(30) | X |
| Crude oil | B | 0.3 | V | V | --- | V | G | V |
| Do | B | 0.4 | V | V | --- | V | G | V |
| Kerosene | C | 0.25 | V | V | --- | V | B(2) | V |
| Crude oil | C | 0.4 | V | V | --- | V | G | V |
| Kerosene | D | 0.2 | V | V | --- | V | G | X |
| Do | D | 0.25 | V | V | --- | V | G | V |
| Do | D | 0.3 | V | V | V | V | G | V |
| Do | D | 0.4 | V | V | V | V | B(15) | V |
| Crude oil | D | 0.2 | V | V | --- | V | G | X |

It will be apparent from the foregoing description of the invention that it has practical application to the preparation of water-in-oil emulsions in general and has special advantages in the preparation of water-in-oil emulsions wherein the aqueous phase is acidic.

The invention is hereby claimed as follows:

1. An emulsion with an acidic internal phase useful in fracturing and acidizing subterranean formations, said emulsion comprising a water-in-oil emulsion wherein the water phase contains 5–25% by weight of hydrochloric acid, the emulsion being emulsified by an emulsifying agent consisting essentially of a mixture selected from the group consisting of (I) (a) 15–80% by weight of a 9–18 carbon fatty acid salt of a partial amide of a polyalkylene polyamine with 2–6 carbon alkylene groups and 3–5 amino nitrogens in which at least two amino groups are amidified with 9–18 carbon monocarboxylic fatty acids and wherein there is at least one non-amidified amino group forming a salt with said acid, and (b) at least one of the members selected from the group consisting of 40–85% by weight of a 9–18 carbon monocarboxylic fatty acid polyester of a tri-lower alkylol amine, 10–40% by weight of a quaternary salt of an N,N-dihydroxyalkylated aliphatic monoamine of 12–18 carbons wherein the quaternizing agent is selected from the group consisting of benzyl chloride, lower alkyl chlorides and bromides, and di-lower alkyl sulfates, 25–75% by weight of a polyoxyethylated organic compound selected from the group consisting of mono-alkyl phenols, di-alkyl phenols, 12–18 carbon aliphatic monoamines, and mixtures thereof, said polyoxyethylated compounds having an average of about 4–15 oxyethylene groups per molecule, 20–55% by weight of a tri-lower alkyl amine wherein the alkyl groups have 3–6 carbons, said percentages in said mixture being based on the total weight of said compounds of said mixture, and (II) (a') 15–50% by weight of a 9–18 carbon monocarboxylic fatty acid salt of a partial amide of a polyalkylene polyamine with 2–6 carbon alkylene groups and 3–5 amino nitrogens in which at least two amino groups are amidified with 9–18 carbon monocarboxylic fatty acids and wherein there is at least one non-amidified amino group forming a salt with said acid and (b') 50–85% by weight of a polyamide of an alkylene polyamine with 2–6 carbon alkylene groups and 2–5 amino nitrogens and a 9–18 carbon monocarboxylic fatty acid, said percentages for (a') and (b') being based on the total weight of (a') and (b').

2. An emulsion with an acidic internal phase useful in fracturing and acidizing subterranean formations, said emulsion comprising a water-in-oil emulsion wherein the water phase contains 5–25% by weight of hydrochloric acid, the emulsion being emulsified by an emulsifying agent consisting essentially of a mixture of (a) 15–50% by weight of a 9–18 carbon monocarboxylic fatty acid salt of a partial amide of a polyalkylene polyamine with 2–6 carbon alkylene groups and 3–5 amino nitrogens in which at least two amino groups are amidified with 9–18 carbon monocarboxylic fatty acids and wherein there is at least one non-amidified amino group forming a salt with said acid and (b) 50–85% by weight of a polyamide of an alkylene polyamine with 2–6 carbon alkylene groups and 2–5 amino nitrogens and a 9–18 carbon monocarboxylic fatty acid, said percentages for (a) and (b) being based on the total weight of (a) and (b).

3. An emulsion with an acidic internal phase useful in fracturing and acidizing subterranean formations, said emulsion comprising a water-in-oil emulsion wherein the water phase contains 5–25% by weight of hydrochloric acid, the emulsion being emulsified by an emulsifying agent consisting essentially of a mixture of (a) 15–60% by weight of a 9–18 carbon fatty acid salt of a partial amide of a polyalkylene polyamine with 2–6 carbon alkylene groups and 3–5 amino nitrogens in which at least two amino groups are amidified with 9–18 carbon monocarboxylic fatty acids and wherein there is at least one non-amidified amino group forming a salt with said acid, and (*b*) 40–85% by weight of a 9–18 carbon monocarboxylic fatty acid polyester of a tri-lower alkylol amine, said percentages for (*a*) and (*b*) being based on the total weight of (*a*) and (*b*).

4. An emulsion with an acidic internal phase useful in fracturing and acidizing subterranean formations, said emulsion comprising a water-in-oil emulsion wherein the water phase contains 5–25% by weight of hydrochloric acid, the emulsion being emulsified by an emulsifying agent consisting essentially of a mixture of (*a*) 60–90% by weight of a 9–18 carbon fatty acid salt of a partial amide of a polyalkylene polyamine with 2–6 carbon alkylene groups and 3–5 amino nitrogens in which at least two amino groups are amidified with 9–18 carbon monocarboxylic fatty acids and wherein there is at least one non-amidified amino group forming a salt with said acid, and (*b*) 10–40% by weight of a quaternary salt of a N,N-dihydroxylkylated aliphatic monoamine of 12–18 carbons wherein the quaternizing agent is selected from the group consisting of benzyl chloride, lower alkyl chlorides and bromides, and di-lower alkyl sulfates, said percentages for (*a*) and (*b*) being based on the total weight of (*a*) and (*b*).

5. An emulsion with an acidic internal phase useful in fracturing and acidizing subterranean formations, said emulsion comprising a water-in-oil emulsion wherein the water phase contains 5–25% by weight of hydrochloric acid, the emulsion being emulsified by an emulsifying agent consisting essentially of a mixture of (*a*) 25–75% by weight of a 9–18 carbon fatty acid salt of a partial amide of a polyalkylene polyamine with 2–6 carbon alkylene groups and 3–5 amino nitrogens in which at least two amino groups are amidified with 9–18 carbon monocarboxylic fatty acids and wherein there is at least one non-amidified amino group forming a salt with said acid, and (*b*) 25–75% by weight of a polyoxyethylated organic compound selected from the group consisting of monoalkyl phenols, di-alkyl phenols, 12–18 carbon aliphatic monoamines, and mixtures thereof, said polyoxyethylated compounds having an average of about 4–15 oxyethylene groups per molecule, said percentages for (*a*) and (*b*) being based on the total weight of (*a*) and (*b*).

6. An emulsion with an acidic internal phase useful in fracturing and acidizing subterranean formations, said emulsion comprising a water-in-oil emulsion wherein the water phase contains 5–25% by weight of hydrochloric acid, the emulsion being emulsified by an emulsifying agent consisting essentially of a mixture of (*a*) 45–80% by weight of a 9–18 carbon fatty acid salt of a partial amide of a polyalkylene polyamine with 2–6 carbon alkylene groups and 3–5 amino nitrogens in which at least two amino groups are amidified with 9–18 carbon monocarboxylic fatty acids and wherein there is at least one non-amidified amino group forming a salt with said acid and (*b*) 20–55% by weight of a tri-lower alkyl amine wherein the alkyl groups have 3–6 carbons, said percentages for (*a*) and (*b*) being based on the total weight of (*a*) and (*b*).

7. A composition adapted to serve as an emulsifier for water-in-oil emulsions having a strongly acidic aqueous phase consisting essentially of a mixture selected from the group consisting of (I) (*a*) 15–80% by weight of a 9–18 carbon fatty acid salt of a partial amide of a polyalkylene polyamine with 2–6 carbon alkylene groups and 3–5 amino nitrogens in which at least two amino groups are amidified with 9–18 carbon monocarboxylic fatty acids and wherein there is at least one non-amidified amino group forming a salt with said acid, and (*b*) at least one of the members selected from the group consisting of 40–85% by weight of a 9–18 carbon monocarboxylic fatty acid polyester of a tri-lower alkylol amine, 10–40% by weight of a quaternary salt of a N,N-dihydroxyalkylated aliphatic monoamine of 12–18 carbons wherein the quaternizing agent is selected from the group consisting of benzyl chloride, lower alkyl chlorides and bromides and di-lower alkyl sulfates, 25–75% by weight of a polyoxyethylated organic compound selected from the group consisting of monoalkyl phenols, di-alkyl phenols, 12–18 carbon aliphatic monoamines, and mixtures thereof, said polyoxyethylated compounds having an average of about 4–15 oxyethylene groups per molecule, 20–55% by weight of a tri-lower alkyl amine wherein the alkyl groups have 3–6 carbons, said percentages in said mixture being based on the total weight of said compounds of said mixture, and (II) (*a'*) 15–50% by weight of a 9–18 carbon monocarboxylic fatty acid salt of a partial amide of a polyalkylene polyamine with 2–6 carbon alkylene groups and 3–5 amino nitrogens in which at least two amino groups are amidified with 9–18 carbon monocarboxylic fatty acids and wherein there is at least one non-amidified amino group forming a salt with said acid and (*b'*) 50–85% by weight of a polyamide of an alkylene polyamine with 2–6 carbon alkylene groups and 2–5 amino nitrogens and a 9–18 carbon monocarboxylic fatty acid, said percentages for (*a'*) and (*b'*) being based on the total weight of (*a'*) and (*b'*).

8. A composition adapted to serve as an emulsifier for water-in-oil emulsions having a strongly acidic aqueous phase consisting essentially of a mixture of (*a*) 15–50% by weight of a 9–18 carbon monocarboxylic fatty acid salt of a partial amide of a polyalkylene polyamine with 2–6 carbon alkylene groups and 3–5 amino nitrogens in which at least two amino groups are amidified with 9–18 carbon monocarboxylic fatty acids and wherein there is at least one non-amidified amino group forming a salt with said acid and (*b*) 50–85% by weight of a polyamide of an alkylene polyamine with 2–6 carbon alkylene groups and 2–5 amino nitrogens and a 9–18 carbon monocarboxylic fatty acid, said percentages for (*a*) and (*b*) being based on the total weight of (*a*) and (*b*).

9. A composition adapted to serve as an emulsifier for water-in-oil emulsions having a strongly acidic aqueous phase consisting essentially of a mixture of (*a*) 15–60% by weight of a 9–18 carbon fatty acid salt of a partial amide of a polyalkylene polyamine with 2–6 carbon alkylene groups and 3–5 amino nitrogens in which at least two amino groups are amidified with 9–18 carbon monocarboxylic fatty acids and wherein there is at least one non-amidified amino group forming a salt with said acid, and (*b*) 40–85% by weight of a 9–18 carbon monocarboxylic fatty acid polyester of a tri-lower alkylol amine, said percentages for (*a*) and (*b*) being based on the total weight of (*a*) and (*b*).

10. A composition adapted to serve as an emulsifier for water-in-oil emulsions having a strongly acidic aqueous phase consisting essentially of a mixture of (*a*) 60–90% by weight of a 9–18 carbon fatty acid salt of a partial amide of a polyalkylene polyamine with 2–6 carbon alkylene groups and 3–5 amino nitrogens in which at least two amino groups are amidified with 9–18 carbon monocarboxylic fatty acids and wherein there is at least one non-amidified amino group forming a salt with said acid, and (*b*) 10–40% by weight of a quaternary salt of a N,N-dihydroxyalkylated aliphatic monoamine of 12–18 carbons wherein the quaternizing agent is selected from the group consisting of benzyl chloride, lower alkyl chlorides and bromides and di-lower alkyl sulfates, said percentages for (*a*) and (*b*) being based on the total weight of (*a*) and (*b*).

11. A composition adapted to serve as an emulsifier for water-in-oil emulsions having a strongly acidic aqueout phase consisting essentially of a mixture of (*a*) 25–75% by weight of a 9–18 carbon fatty acid salt of a partial amide of a polyalkylene polyamine with 2–6 carbon alkylene groups and 3–5 amino nitrogens in which at least two amino groups are amidified with 9–18 carbon monocarboxylic fatty acids and wherein there is at least one non-amidified amino group forming a salt with said acid, and (b) 25–75% by weight of a polyoxyethylated organic compound selected from the group consisting of monoalkyl phenols, di-alkyl phenols, 12–18 carbon aliphatic monoamines, and mixtures thereof, said polyoxyethylated compounds having an average of about 4–15 oxyethylene groups per molecule, said percentages for (a) and (b) being based on the total weight of (a) and (b).

12. A composition adapted to serve as an emulsifier for water-in-oil emulsions having a strongly acidic aqueous phase consisting essentially of a mixture of (a) 45–80% by weight of a 9–18 carbon fatty acid salt of a partial amide of a polyalkylene polyamine with 2–6 carbon alkylene groups and 3–5 amino nitrogens in which at least two amino groups are amidified with 9–18 carbon monocarboxylic fatty acids and wherein there is at least one non-amidified amino group forming a salt with said acid, and (b) 20–55% by weight of a tri-lower alkyl amine wherein the alkyl groups have 3–6 carbons, said percentages for (a) and (b) being based on the total weight of (a) and (b).

13. A process for fracturing a subterranean formation by hydraulic pressure with an acidizing fluid which comprises pumping an emulsion with an acidic internal phase comprising a water-in-oil emulsion wherein the water phase contains 5–25% by weight of hydrochloric acid, the emulsion being emulsified by an emulsifying agent consisting essentially of a mixture selected from the group consisting of (I) (a) 15–80% by weight of a 9–18 carbon fatty acid salt of a partial amide of a polyalkylene polyamine with 2–6 carbon alkylene groups and 3–5 amino nitrogens in which at least two amino groups are amidified with 9–18 carbon monocarboxylic fatty acids and wherein there is at least one non-amidified amino group forming a salt with said acid, and (b) at least one of the members selected from the group consisting of 40–85% by weight of a 9–18 carbon monocarboxylic fatty acid polyester of a tri-lower alkylol amine, 10–40% by weight of a quaternary salt of a N,N-dihydroxyalkylated aliphatic monoamine of 12–18 carbons wherein the quaternizing agent is selected from the group consisting of benzyl chloride, lower alkyl chlorides and bromides, and di-lower alkyl sulfates, 25–75% by weight of a polyoxyethylated organic compound selected from the group consisting of monoalkyl phenols, di-alkyl phenols, 12–18 carbon aliphatic monoamines, and mixtures thereof, said polyoxyethylated compounds having an average of about 4–15 oxyethylene groups per molecule, 20–55% by weight of a tri-lower alkyl amine wherein the alkyl groups have 3–6 carbons, said percentages in said mixture being based on the total weight of said compounds of said mixture, and (II) (a') 15–50% by weight of a 9–18 carbon monocarboxylic fatty acid salt of a partial amide of a polyalkylene polyamine with 2–6 carbon alkylene groups and 3–5 amino nitrogens in which at least two amino groups are amidified with 9–18 carbon monocarboxylic fatty acids and wherein there is at least one non-amidified amino group forming a salt with said acid and (b') 50–85% by weight of a polyamide of an alkylene polyamine with 2–6 carbon alkylene groups and 2–5 amino nitrogens and a 9–18 carbon monocarboxylic fatty acid, said percentages for (a') and (b') being based on the total weight of (a') and (b') until the formation cracks, and recovering the oil and water of said emulsion from said formation.

14. A process for fracturing a subterranean formation by hydraulic pressure with an acidizing fluid which comprises pumping an emulsion with an acidic internal phase comprising a water-in-oil emulsion wherein the water phase contains 5–25% by weight of hydrochloric acid, the emulsion being emulsified by an emulsifying agent consisting essentially of a mixture of (a) 15–50% by weight of a 9–18 carbon monocarboxylic fatty acid salt of a partial amide of a polyalkylene polyamine with 2–6 carbon alkylene groups and 3–5 amino nitrogens in which at least two amino groups are amidified with 9–18 carbon monocarboxylic fatty acids and wherein there is at least one non-amidified amino group forming a salt with said acid and (b) 50–85% by weight of a polyamide of an alkylene polyamine with 2–6 carbon alkylene groups and 2–5 amino nitrogens and a 9–18 carbon monocarboxylic fatty acid, said percentages for (a) and (b) being based on the total weight of (a) and (b), until the formation cracks, and recovering the oil and water of said emulsion from said formation.

15. A process for fracturing a subterranean formation by hydraulic pressure with an acidizing fluid which comprises pumping an emulsion with an acidic internal phase comprising a water-in-oil emulsion wherein the water phase contains 5–25% by weight of hydrochloric acid, the emulsion being emulsified by an emulsifying agent consisting essentially of a mixture of (a) 15–60% by weight of a 9–18 carbon fatty acid salt of a partial amide of a polyalkylene polyamine with 2–6 carbon alkylene groups and 3–5 amino nitrogens in which at least two amino groups are amidified with 9–18 carbon monocarboxylic fatty acids and wherein there is at least one non-amidified amino group forming a salt with said acid, and (b) 40–85% by weight of a 9–18 carbon monocarboxylic fatty acid polyester of a tri-lower alkylol amine, said percentages for (a) and (b) being based on the total weight of (a) and (b), until the formation cracks, and recovering the oil and water of said emulsion from said formation.

16. A process for fracturing a subterranean formation by hydraulic pressure with an acidizing fluid which comprises pumping an emulsion with an acidic internal phase comprising a water-in-oil emulsion wherein the water phase contains 5–25% by weight of hydrochloric acid, the emulsion being emulsified by an emulsifying agent consisting essentially of a mixture of (a) 60–90% by weight of a 9–18 carbon fatty acid salt of a partial amide of a polyalkylene polyamine with 2–6 carbon alkylene groups and 3–5 amino nitrogens in which at least two amino groups are amidified with 9–18 carbon monocarboxylic fatty acids and wherein there is at least one non-amidified amino group forming a salt with said acid, and (b) 10–40% by weight of a quaternary salt of a N,N-dihydroxyalkylated aliphatic monoamine of 12–18 carbons wherein the quaternizing agent is selected from the group consisting of benzyl chloride, lower alkyl chlorides and bromides, and di-lower alkyl sulfates, said percentages for (a) and (b) being based on the total weight of (a) and (b), until the formation cracks, and recovering the oil and water of said emulsion from said formation.

17. A process for fracturing a subterranean formation by hydraulic pressure with an acidizing fluid which comprises pumping an emulsion with an acidic internal phase comprising a water-in-oil emulsion wherein the water phase contains 5–25% by weight of hydrochloric acid, the emulsion being emulsified by an emulsifying agent consisting essentially of a mixture of (a) 25–85% by weight of a 9–18 carbon fatty acid salt of a partial amide of a polyalkylene polyamine with 2–6 carbon alkylene groups and 3–5 amino nitrogens in which at least two amino groups are amidified with 9–18 carbon monocarboxylic fatty acids and wherein there is at least one non-amidified amino group forming a salt with said acid, and (b) 25–75% by weight of a polyoxyethylated organic compound selected from the group consisting of monoalkyl phenols, dialkyl phenols, 12–18 carbon aliphatic monoamines, and mixtures thereof, said polyoxyethylated compounds having an average of about 4–15 oxyethylene groups per molecule, said percentages for (a) and (b) being based on the total weight of (a) and (b), until the formation cracks, and recovering the oil and water of said emulsion from said formation.

18. A process for fracturing a subterranean formation by hydraulic pressure with an acidizing fluid which comprises pumping an emulsion with an acidic internal phase comprising a water-in-oil emulsion wherein the water phase contains 5–25% by weight of hydrochloric acid, the emulsion being emulsified by an emulsifying agent consisting essentially of a mixture of (a) 45–80% by weight of a 9–18 carbon fatty acid salt of a partial amide of a polyalkylene polyamine with 2–6 carbon alkylene groups and 3–5 amino nitrogens in which at least two amino groups are amidified with 9–18 carbon monocarboxylic fatty acids and wherein there is at least one non-amidified amino group forming a salt with said acid, and mixtures of said salt and said polyamide, and (b) 20–55% by weight of a tri-lower alkyl amine wherein the alkyl groups have 3–6 carbons, said percentages for (a) and (b) being based on the total weight of (a) and (b), until the formation cracks, and recovering the oil and water of said emulsion from said formation.

References Cited in the file of this patent
UNITED STATES PATENTS

| | | |
|---|---|---|
| 2,173,058 | Kritchevsky | Sept. 12, 1939 |
| 2,228,985 | De Groote et al. | Jan. 14, 1941 |
| 2,228,986 | De Groote et al. | Jan. 14, 1941 |
| 2,347,178 | Fritz et al. | Apr. 25, 1944 |
| 2,802,531 | Cardwell et al. | Aug. 13, 1957 |
| 2,946,746 | Keller | July 26, 1960 |
| 2,999,063 | Hoeppel | Sept. 5, 1961 |

OTHER REFERENCES

Schwartz et al.: Surface Active Agents, pub. 1949 by Interscience Publishers Inc., New York, page 173.

UNITED STATES PATENT OFFICE
CERTIFICATE OF CORRECTION

Patent No. 3,169,113                                            February 9, 1965

Willard H. Kirkpatrick et al.

It is hereby certified that error appears in the above numbered patent requiring correction and that the said Letters Patent should read as corrected below.

Column 7, line 21, for "Example XI" read -- Example VI --; columns 9 and 10, in the TABLE, the heading to the fourth column should read -- Emulsification --; column 15, lines 15 and 16, strike out "and mixtures of said salt and said polyamide,".

Signed and sealed this 24th day of August 1965.

(SEAL)
Attest:

ERNEST W. SWIDER                                        EDWARD J. BRENNER
Attesting Officer                                              Commissioner of Patents